United States Patent Office 3,296,272
Patented Jan. 3, 1967

3,296,272
SULFINYL- AND SULFONYLPYRIDINES
Howard Johnston, Walnut Creek, Calif., assignor to The Dow Chemical Company, Midland, Mich., a corporation of Delaware
No Drawing. Filed Apr. 1, 1965, Ser. No. 444,861
9 Claims. (Cl. 260—294.8)

The present invention is directed to a group of new and novel compounds and methods employing and composition containing these compounds as pesticidal constituents. This case is a continuation-in-part of my copending application Serial No. 417,837, filed December 11, 1964, now abandoned.

The new and novel compounds of the present invention are pyridine derivatives having the formula L—M—R. In this and succeeding formulae, R represents alkyl, monohalolower-alkyl, dihalolower-alkyl, trihalolower-alkyl, phenyl, monohalo-phenyl, benzyl and monohalo-benzyl; M represents sulfinyl (—SO—) or sulfonyl (—SO$_2$—) and L represents

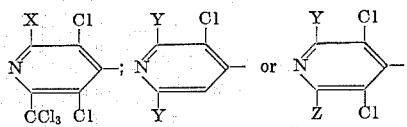

in which X represents chlorine or hydrogen, each Y represents chlorine, bromine or fluorine and Z represents Y or hydrogen.

The term "alkyl" as employed in the present specification and claims designates an alkyl group containing 1, 2, 3, 4, etc. and up to 12 carbon atoms, and from 1 to 2, to 3, to 4, to 5, to 6, etc. and up to and including 12 carbon atoms such dodecyl, octyl, heptyl, hexyl, sec.-hexyl, butyl, decyl, 4-methyldecyl, undecyl, nonyl, isobutyl, tert.-butyl, isoamyl, amyl, propyl, ethyl, isopropyl, 3-ethylnonyl, 2 - ethylhexyl, and 3 - propylheptyl. The expression "loweralkyl" is employed in the present specification and claims to designate an alkyl group containing 1, 2, 3, 4, and 5 carbon atoms, and from 1 to 2, to 3, to 4, to 5 carbon atoms such as methyl, ethyl, isopropyl, propyl, tert.-butyl, butyl, amyl, sec.-amyl, etc. Also, the terms "halogen" and "halo" are employed herein to represent chlorine and bromine. Representative halo-lower alkyl moieties include omega-trihalo-lower alkyl; omega-dihalo-lower alkyl, omega-halo-lower alkyl; alpha-halo-lower alkyl; alphadihalo-lower alkyl; 2,3-dihalo-propyl, butyl or amyl; 2,2,3-trihalopropyl, butyl or amyl; 3,4-dihalobutyl; 3,4-dihaloamyl; 4,5-dihaloamyl; 2,3,4-trihalobutyl; 3,4,4-trihalobutyl, etc. In the present specification, those compounds of the present invention wherein M represents the sulfinyl group (—SO—) are identified as sulfinylpyridines and these compounds wherein M represents the sulfonyl group (—SO$_2$—) are identified as sulfonylpyridines.

The pyridines of the present invention are crystalline solids which are of low solubility in water and of moderate solubility in common organic solvents; they are useful as pesticides for the control of various organisms and particularly for the control of many bacterial and fungal pests as *Venturia inaequalis, Staphylococcus aureus, Candida albicans, Verticillium albo-atrum, Piricularia oryzae,* Phythium spp., *Rhizoctonia solani, Fusarium solani, Salmonella pullorum, Trichophyton mentagrophytes, Erwinia amylovora, Bacillus cereus, Cerospora beticola, Penicillium digitatum, Streptomyces scabies* and *Thielaviopsis basicola.*

Representative sulfonyl- and sulfinylpyridines include
2,3,6-trichloro-4-(heptylsulfonyl)pyridine,
2,6-dibromo-3,5-dichloro-4-(butylsulfonyl)pyridine,
2,3,6-trichloro-4-(phenylsulfonyl)pyridine,
2fluoro-3,5-dichloro-4-(m-chlorobenzylsulfonyl) pyridine,
2-trichloromethyl-3,5,6-trichloro-4-(benzylsulfonyl) pyridine,
2,3,6-trichloro-4-(3',3',3'-tribromopropylsulfonyl) pyridine,
2-trichloromethyl-3,5,6-trichloro-4-(2',2'-dichloro-butylsulfonyl)pyridine,
2-bromo-3,5-dichloro-4-(2',3'-dichloropropylsulfonyl) pyridine,
2-trichloromethyl-3,6-dichloro-4-(2'-methylpropyl-sulfonyl)pyridine,
2-trichloromethyl-3,5-dichloro-4-(o-bromobenzyl-sulfonyl)pyridine,
2-trichloromethyl-3,5-dichloro-4-(nonylsulfonyl) pyridine,
2-fluoro-3,5-dichloro-4-(decylsulfonyl)pyridine,
2-trichloromethyl-3,5-dichloro-4-(undecylsulfonyl) pyridine,
2,6-difluoro-3,5-dichloro-4-(octylsulfonyl)pyridine,
2,3,5,6-tetrachloro-4-(methylsulfinyl)pyridine,
2,3,5-trichloro-4-(3',3'-dichlorobutylsulfinyl)pyridine,
2,3,6-trichloro-4-(m-chlorophenylsulfinyl)pyridine,
2,6-difluoro-3,5-dichloro-4-(o-chlorophenylsulfinyl) pyridine,
2-trichloromethyl-3,5-dichloro-4-(3'-bromobutylsulfinyl) pyridine,
2-trichloromethyl-3,5,6-trichloro-4-(decylsulfinyl) pyridine,
2-bromo-3,5-dichloro-4-(bromomethylsulfinyl)pyridne,
2-trichloromethyl-3,5,6-trichloro-4-(o-benzylsulfinyl) pyridine,
2,3,5-trichloro-4-(decylsulfinyl)pyridine,
2-fluoro-3,5-dichloro-4-(heptylsulfinyl)pyridine,
2,3,6-trichloro-4-(dodecylsulfinyl)pyridine,
2,3,6-trichloro-4-(2,2-dichloroamylsulfinyl)pyridine and
2,3,5,6-tetrachloro-4-(butylsulfinyl)pyridine.

The compounds of the present invention are prepared by oxidizing certain thiopyridines having one of the formulas $$\begin{array}{ccc} \text{X} \quad \text{Cl} & \text{Y} \quad \text{Cl} & \text{Y} \quad \text{Cl} \\ \diagup \hspace{-4pt}\diagdown & \diagup \hspace{-4pt}\diagdown & \diagup \hspace{-4pt}\diagdown \\ \text{N} \hspace{20pt} \text{—S—R}; & \text{N} \hspace{20pt} \text{—S—R} \quad \& & \text{N} \hspace{20pt} \text{—S—R} \\ \text{CCl}_3 \quad \text{Cl} & \text{Y} & \text{Z} \quad \text{Cl} \end{array}$$

to the corresponding sulfinylpyridines and sulfonylpyridines. The oxidation of any specific thiopyridine starting material results, at least partially, in the preparation of the corresponding sulfinylpyridine compound. In many instances, this compound, if subjected to continuing oxidative conditions, is further oxidized to the corresponding sulfonylpyridine compound. In some instances, the oxidation proceeds to the sulfonylpyridine so rapidly that it is not practical to isolate the sulfinyl compound. The oxidation of the thiopyridine compounds is accomplished by employing an oxidizing agent. Representative oxidizing agents for the production of the sulfinylpyridine compounds include nitric acid and hydrogen peroxide and representative oxidizing agents to be employed in the preparation of the sulfonyl compounds include fuming nitric acid, nitric acid, hydrogen peroxide, potassium permanganate and chromate-sulfuric acid (mixture of alkali metal chromate and sulfuric acid).

The oxidation of one molecule of thiopyridine to the corresponding sulfinylpyridine or the oxidation of one molecule of a sulfinylpyridine to the corresponding sulfonylpyridine requires one atom of oxygen. The oxidation of one of the thiopyridines directly to the corresponding sulfonylpyridine, on the other hand, consumes two atoms of oxygen for each molecule of thiopyridine so oxidized. One molecule of the oxidizing agents herein employed yields one atom of oxygen to be consumed by the oxidation of the pyridine starting material. In carrying out the various oxidation reactions to prepare the compounds of the present invention, it is preferable to employ the oxidizing agent in molar quantities which will provide oxygen in the stoichiometric quantities consumed in the particular reaction. In some instances, the use of a slight excess of the oxidizing agent is preferred. However, the use of the reactants in any particular proportion is not necessary, some of the desired product being formed upon combining the reactants in any proportions.

Hydrogen peroxide, and conveniently an aqueous solution thereof, can be employed as the oxidizing agent in the production of the pyridine derivatives of the present invention. In such embodiment, the reaction is carried out in the presence of a liquid reaction media, such as acetone, glacial acetic acid or a mixture of acetic acid and acetic anhydride. In a preferred procedure, the acid-anhydride mixture is employed as the liquid reaction medium. The reaction takes place at temperatures of from about 75° C. to about 120° C. In a convenient method, the reaction is carried out at the boiling temperature and under reflux. In carrying out the reaction, the reactants are contacted in any order or fashion, and preferably in amounts stoichiometric for the preparation of the desired product. The reaction mixture is then maintained at a temperature within the reaction temperature range for a short period of time. Following the reaction period, the sulfinyl- or sulfonyl-pyridine product can be separated by conventional procedures such as evaporation of the reaction medium to obtain the product as a solid residue. In an alternative procedure, the reaction mixture is washed with cold water and is thereafter filtered to obtain the crystalline product.

Nitric acid is conveniently employed to oxidize the thiopyridine starting materials to the corresponding sulfinylpyridines. The reaction can be carried out in the presence of a haloalkane as reaction medium such as carbon tetrachloride, methylene dichloride, ethylene dibromide, etc. In a preferred procedure, excess nitric acid is employed as reaction medium. The reaction proceeds at temperatures between about 15° C. and about 120° C. Preferably the reaction is carried out at temperatures of from 80° C. to 120° C. and requires only a short period of time for completion. The contacting of the reagents and separation and isolation of the desired product are all as previously described.

By employing the same procedures and reaction conditions as described in the immediately preceding paragraph, nitric acid or fuming nitric acid can be employed to prepare the sulfonylpyridines from either the corresponding thiopyridines or sulfinylpyridines. In a preferred procedure, the acid is employed in quantities slightly in excess of the theoretical quantities consumed by the reaction. Following the reaction, the desired product is separated in accordance with the methods previously described.

In still another procedure, potassium permanganate or chromate-sulfuric acid mixture, and conveniently the chromate as the potassium or sodium salt, can be employed as the oxidizing agent in the preparation of sulfonylpyridines from the corresponding thiopyridines or sulfinylpyridines. The oxidation is carried out in the presence of a liquid medium such as water and at temperatures of from about 10° to about 70° C. In a preferred procedure, the potassium permanganate oxidation is carried out in a medium wherein the pH is less than 7. In such procedures the pH of the reaction mixture can be made acetic by the addition of acid. Representative acids include sulfuric, nitric, hydrochloric, phosphoric and acetic. The methods of isolating the desired product are all as previously described.

Representative thiopyridines to be employed as starting materials in accordance with the foregoing paragraphs include 2,3,5 - tricholor-4-(2,3-dibromopropylthio)pyridine, 2,3,5-trichloro-4-(o-bromobenzylthio)pyridine, 2,3, 5 - trichloro-4-(decylthio)pyridine, 2,3,5,6-tetrachloro-4-(phenylthio)pyridine, 2 - trichloromethyl-3,5-dichloro-4-(o-chlorophenylthio)pyridine, 2,3,6 - trichloro-4-(decylthio)pyridine, 2,3,6 - trichloro-4-(2'-chloropropylthio)pyridine, 2,6 - difluoro-3,5-dichloro-4-(o-bromophenylthio)pyridine, 2,6 - dibromo-3,5-dichloro-4-(benzylthio)pyridine, 2 - fluoro - 3,5-dichloro-4-(4',4'-dibromobutylthio)pyridine, 2 - bromo - 3,5-dichloro-4-(m-chlorophenylthio) pyridine, 2 - tricholoromethyl-3,5,6-trichloro-4-(2'-chlorophenylthio)pyridine, 2 - trichloromethyl-3,5,6-trichloro-4-(sec.-butylthio)pyridine, 2 - trichloromethyl-3,5-dichloro-4 - (hexylthio)pyridine, 2,6-difluoro-3,5-dichloro-4-(ethylthio)pyridine, 2,3,6 - trichloro-4-(m-bromobenzylthio)pyridine, 2 - trichloromethyl-3,5-dichloro-4-(phenylthio)pyridine, 2-trichloromethyl-3,5,6-trichloro-4-(bromomethylthio)pyridine and 2,3,5,6 - tetrachloro-4-(3-ethylheptylthio)pyridine.

The following examples are merely illustrations of the invention and are not to be construed as limiting.

EXAMPLE 1

*2,3,5-trichloro-4-(methylsulfonyl)pyridine*

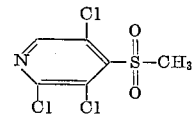

Hydrogen peroxide (4.64 grams; 0.136 mole) in 30 percent aqueous solution is added portionwise at room temperature with stirring to 2,3,5-trichloro-4-methylthiopyridine (10 grams; 0.044 mole) dispersed in 50 milliliters of glacial acetic acid. The resulting mixture is stirred at room temperature for 2½ hours and then allowed to stand overnight. The reaction mixture is then heated to the boiling temperature and maintained thereat for 1 hour and under reflux. The refluxed mixture is allowed to cool to room temperature and poured into ice water. During the cooling and dilution procedure, the 2,3,5-trichloro-4-(methylsulfonyl)pyridine product precipitates as a crystalline solid. This crystalline product is collected by filtration, dried and recrystallized from hexane. The recrystallized product melts at 103° C. and has carbon, nitrogen and chlorine contents of 28, 5.06 and 41.18 percent as compared to theoretical contents of 27.6, 5.4 and 40.8 percent, respectively.

EXAMPLE 2

*2,3,5-trichloro-4-(2-bromoethylsulfonyl)pyridine*

Hydrogen peroxide (12.9 grame; 0.38 mole) in 30 percent aqueous solution is added portionwise at room temperature with stirring to 2,3,5- trichloro-4-(2-bromoethylthio)pyridine (3.0 grams; 0.0085 mole) dispersed in 50 milliliters of a 50:50 mixture of acetic acid and acetic anhydride. Stirring is thereafter continued for 4 hours at room temperature and the reaction mixture diluted with ice water. During the dilution, the 2,3,5-trichloro-4-(2-bromoethylsulfonyl)pyridine product precipitates as a solid and is separated by filtration. 2,3,5-trichloro-4-(2-bromoethylsulfonyl)pyridine melts at 121° C. and has carbon, chlorine, bromine and sulfur contents of 24, 29.9,

EXAMPLE 3

*2,3,5,6-tetrachloro-4-(ethylsulfinyl)pyridine*

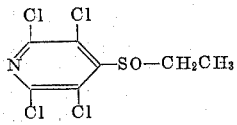

Ten grams (0.034 mole) of 2,3,5,6-tetrachloro-4-(ethylthio)pyridine is added slowly portionwise to 50 milliliters of concentrated nitric acid. Following contacting of the reactants, the reaction mixture is heated to the boiling temperature and maintained at that temperature for 20 minutes. The reaction mixture is then allowed to come to room temperature and thereafter diluted with ice water. During the dilution, the 2,3,5,6-tetrachloro-4-(ethylsulfinyl)pyridine product precipitates as a solid material. This product is collected by filtration and air dried. 2,3,5,6-tetrachloro-4-(ethylsulfinyl)pyridine is a crystalline solid melting at 113° C. and having carbon, chlorine and nitrogen contents of 28.74, 48.24 and 10.76 percent as compared to theoretical contents of 28.7, 48.3 and 48.24 percent.

EXAMPLE 4

*2,3,5-trichloro-4-(dodecylsulfonyl)pyridine*

2,3,5-trichloro-4-(dodecylthiol)pyridine (13.8 grams; 0.05 mole) is added slowly portionwise at room temperature with stirring to 50 milliliters of concentrated nitric acid. Stirring is thereafter continued for 4 hours at 35° C. and the reaction mixture diluted with water and thereafter filtered. As a result of these operations, there is obtained the 2,3,5-trichloro-4-(dodecylsulfonyl)pyridine product as a crystalline solid. 2,3,5-trichloro-4-(dodecylsulfonyl)pyridine melts at 46° C. and has carbon, chlorine and sulfur contents of 48.6, 25.88 and 7.6 percent as compared to theoretical contents of 49.2, 25.7 and 7.75 percent, respectively.

EXAMPLE 5

*2,3,5,6-tetrachloro-4-(methylsulfonyl)pyridine*

Hydrogen peroxide (4.1 grams; 0.12 mole) in 30 percent aqueous solution is added rapidly portionwise at room temperature with stirring to 25 grams (0.095 mole) of 2,3,5,6-tetrachloro-4-(methylthio)pyridine dispersed in 150 milliliters of glacial acetic acid. Stirring is thereafter continued for 6 hours at room temperature and the reaction mixture thereafter diluted with ice water. During the dilution, the 2,3,5,6-tetrachloro-4-(methylsulfonyl)pyridine product precipitates as a crystalline solid and is separated by filtration. 2,3,5,6-tetrachloro-4-(methylsulfonyl)pyridine melts at 138°–140° C. and has carbon, chlorine and sulfur contents of 24.66, 47.85 and 11.26 percent as compared to theoretical contents of 24.4, 48 and 10.9 percent, respectively.

EXAMPLE 6

*2,3,5,6-tetrachloro-4-(ethylsulfonyl)pyridine*

Hydrogen peroxide (6 grams; 0.178 mole) is added rapidly portionwise with stirring to 25 grams (0.01 mole) of 2,3,5,6-tetrachloro-4-(ethylsulfinyl)pyridine dispersed in 200 milliliters of glacial acetic acid. The reaction mixture is thereafter set aside at room temperature for 4 days and then warmed to the boiling temperature and maintained thereat for one hour with stirring. Following this period, the mixture is cooled to room temperature and diluted with 300 milliliters of ice water. During the dilution, the 2,3,5,6-tetrachloro-4-(ethylsulfonyl)pyridine product precipitates as a crystalline solid and is separated by filtration. 2,3,5,6-tetrachloro-4-(ethylsulfonyl)pyridine melts at 128°–131° C. and has carbon, chlorine and sulfur contents of 27.22, 45.68 and 10.49 percent as compared to theoretical contents of 27.2, 45.8 and 10.4 percent, respectively.

EXAMPLE 7

*2,3,5-trichloro-4-(ethylsulfonyl)pyridine*

2,3,5-trichloro-4-(ethylthio)pyridine (9.8 grams; 0.05 mole) is added portionwise with stirring to a slightly basic mixture comprising 100 milliliters of water and 15.8 grams of potassium permanganate (0.1 mole). The resulting dispersion is heated at 35° C. for 3 hours. Following the heating period, the reaction mixture is cooled to room temperature and diluted with ice water. During the dilution procedure, the 2,3,5-trichloro-4-(ethylsulfonyl)pyridine product precipitates as a crystalline solid, and is separated by filtration. 2,3,5-trichloro-4-(ethylsulfonyl)pyridine melts at 87° C.

In an analogous procedure, 9.8 grams of 2,3,5-trichloro-4-(ethylthio)pyridine (0.05 mole) is combined with a mixture of 10 grams of potassium chromate dispersed in 50 milliliters of 1.5 normal sulfuric acid. Thereafter, the reaction mixture is processed and the 2,3,5-trichloro-4-(ethylsulfonyl)pyridine product separated from the reaction mixture as described in the preceding paragraph.

In similar procedures, the following compounds of the present invention are prepared:

2,3,5,6-tetrachloro-4-(methylsulfonyl)pyridine (melting at 138°–140° C.) by oxidizing 2,3,5,6-tetrachloro-4-(methylthio)pyridine with fuming nitric acid.

2,3,5,6-tetrachloro-4-(ethylsulfonyl)pyridine (melting at 129°–131° C.) by oxidizing 2,3,5,6-tetrachloro-4-(ethylthio)pyridine with hydrogen peroxide in the presence of acetone.

2,3,5,6-tetrachloro-4-(hexylsulfinyl)pyridine (melting at 62.5° C.) by oxidizing 2,3,5,6-tetrachloro-4-(hexylthio)pyridine with nitric acid.

2,3,5,6-tetrachloro-4-(propylsulfonyl)pyridine (melting at 163°–172° C.) by oxidizing 2,3,5,6-tetrachloro-4-(propylthio)pyridine with potassium permanganate.

2,3,5,6-tetrachloro-4-(butylsulfinyl)pyridine (melting at 113° C.) by oxidizing 2,3,5,6-tetrachloro-4-(butylthio)pyridine with hydrogen peroxide.

2,3,5-trichloro-4-(m-bromophenylsulfinyl)pyridine (molecular weight 385) by oxidizing 2,3,5-trichloro-4-(m-bromophenylthio)pyridine with nitric acid.

2,3,5,6-tetrachloro-4 - (2'-chloroethylsulfonyl)pyridine (melting at 182° C.) by oxidizing 2,3,5,6-tetrachloro-4-(2-chloroethylsulfinyl)pyridine with hydrogen peroxide.

2,3,5 - trichloro - 4 - (2' - bromoethylsulfonyl)pyridine (melting at 121° C.) by oxidizing 2,3,5-trichloro-4-(2-bromoethylthio)pyridine with hydrogen peroxide.

2,3,5-trichloro-4-(butylsulfonyl)pyridine (melting at 78.5° C.) by oxidizing 2,3,5-trichloro-4-(butylsulfinyl)pyridine with hydrogen peroxide.

2-trichloromethyl-3,5-dichloro - 4-(methylsulfinyl)pyridine (melting at 160°–162° C.) by oxidizing 2-trichloromethyl-3,5-dichloro-4-(methylthio)pyridine with hydrogen peroxide.

2,3,5-trichloro-4-(p-chlorobenzylsulfonyl)pyridine (molecular weight 371) by oxidizing 2,3,5-trichloro-4-(p-chlorobenzylthio)pyridine with a mixture of potassium chromate and sulfuric acid.

2,3,5-trichloro-4-(isopropylsulfonyl)pyridine (melting at 84° C.) by oxidizing 2,5-trichloro-4-(isopropylthio)pyridine with hydrogen peroxide in the presence of glacial acetic acid.

2,3,6-trichloro-4-(methylsulfonyl)pyridine (melting at 121° C.) by oxidizing 2,3,6-trichloro-4-(methylsulfinyl)pyridine with fuming nitric acid.

2,3,6-trichloro-4 - (butylsulfonyl)pyridine (molecular weight of 412) by oxidizing 2,3,6-trichloro-4-(butylthio)pyridine with hydrogen peroxide in the presence of glacial acetic acid.

2,3,5-trichloro - 4 - (p - chlorophenylsulfonyl)pyridine (melting at 136°–137.5° C.) by oxidizing 2,3,5-trichloro- 4-(p-chlorophenylthio)pyridine with hydrogen peroxide in the presence of glacial acetic acid.

2,6-difluoro-3,5-dichloro - 4 - (methylsulfonyl)pyridine (melting at 118°–123° C.) by oxidizing 2,6-difluoro-3,5-dichloro-4-(methylthio)pyridine with hydrogen peroxide.

2,3,4,6 - tetrachloro-4-(p-chlorophenylsulfonyl)pyridine (melting at 228°–234° C.) by oxidizing 2,3,4,6-tetrachloro-4-(p-chlorophenylthio)pyridine with hydrogen peroxide.

2,3,4,6 - tetrachloro-4-(p-chlorobenzylsulfonyl)pyridine (melting at 144°–146° C.) by oxidizing 2,3,4,6-tetrachloro-4-(p-chlorobenzylthio)pyridine with hydrogen peroxide.

2-bromo-3,5 - dichloro - 4 - (methylsulfonyl)pyridine (melting at 92% C.) by oxidizing 2-bromo-3,5-dichloro-4-(methylthio)pyridine with nitric acid.

2-fluoro-3,5 - dichloro - 4 - (methylsulfonyl)pyridine (melting at 88°–90° C.) by oxidizing 2-fluoro-3,5-dichloro-4-(methylthio)pyridine with hydrogen peroxide.

2,3,5-trichloro-4-(benzylsulfonyl)pyridine (melting at 111° C.) by oxidizing 2,3,5-trichloro-4-(benzylthio)pyridine with hydrogen peroxide.

2,3,5-trichloro-4-(ethylsulfonyl)pyridine (melting at 87° C.) by oxidizing 2,3,5-trichloro-4-(ethylthio)pyridine with potassium permanganate.

2-trichloromethyl-3,5 - dichloro - 4 - (propylsulfonyl)pyridine (melting at 107.5° C.) by oxidizing 2-trichloromethyl-3,5-dichloro-4-(propylthio)pyridine with hydrogen peroxide.

2-trichloromethyl-3,5,6-trichloro - 4 - (methylsulfonyl)pyridine (melting at 127.5° C.) by oxidizing 2-trichloromethyl-3,5,6-trichloro-4-(methylthio)pyridine with hydrogen peroxide.

2,3,5-trichloro - 4 - (methylsulfinyl)pyridine (melting at 91° C.) by oxidizing 2,3,5-trichloro-4-(methylthio)pyridine with hydrogen peroxide.

2,3,5-trichloro - 4 - (5' - bromopentylsulfonyl)pyridine (melting at 64.5° C.) by oxidizing 2,3,5-trichloro-4-(5'-bromopentylthio)pyridine with hydrogen peroxide.

2,3,5,6-tetrachloro-4-(pentylsulfonyl)pyridine (melting at 91.9° C.) by oxidizing 2,3,5,6-tetrachloro-4-(pentylthio)pyridine with fuming nitric acid.

2,3,5,6 - tetrachloro - 4 - (isobutylsulfonyl)pyridine (melting at 119° C.) by oxidizing 2,3,5,6-tetrachloro-4-(isobutylthio)pyridine with nitric acid.

2,3,5,6-tetrachloro - 4 - (2' - bromoethylsulfonyl)pyridine (melting at 199° C.) by oxidizing 2,3,5,6-tetrachloro-4-(2'-bromoethylthio)pyridine with hydrogen peroxide.

2,3,5,6 - tetrachloro - 4 - (chloromethylsulfonyl)pyridine (melting at 113.5° C.) by oxidizing 2,3,5,6-tetrachloro-4-(chloromethylthio)pyridine with hydrogen peroxide.

2,3,5,6-tetrachloro - 4 - (propylsulfinyl)pyridine (melting at 120.5° C.) by oxidizing 2,3,5,6-tetrachloro-4-(propylthio)pyridine with nitric acid.

2,3,5,6-tetrachloro - 4 - (ethylsulfinyl)pyridine (melting at 113° C.) by oxidizing 2,3,5,6-tetrachloro-4-(ethylthio)pyridine with hydrogen peroxide.

2,3,5,6-tetrachloro - 4 - (butylsulfinyl)pyridine (melting at 113° C.) by oxidizing 2,3,5,6-tetrachloro-4-(butylthio)pyridine with hydrogen peroxide.

2,3,5,6-tetrachloro - 4 - (hexylsulfinyl)pyridine (melting at 62.5° C.) by oxidizing 2,3,5,6-tetrachloro-4-(hexylthio)pyridine with hydrogen peroxide.

2,3,6-trichloro - 4 - (methylsulfinyl)pyridine (molecular weight of 244) by oxidizing 2,3,6-trichloro-4-(methylthio)pyridine with hydrogen peroxide.

2,6-dibromo-3,5-dichloro - 4 - (methylsulfinyl)pyridine (molecular weight of 378) by oxidizing 2,6-dibromo-3,5-dichloro-4-(methylthio)pyridine with hydrogen peroxide.

2-fluoro-3,5 - dichloro - 4 - (methylsulfinyl)pyridine (molecular weight of 228) by oxidizing 2-fluoro-3,5-dichloro-4-(methylthio)pyridine with hydrogen peroxide.

2-trichloromethyl-3,5 - dichloro - 4 - (methylsulfinyl) pyridine (molecular weight 237) by oxidizing 2-trichloromethyl-3,5-dichloro-4-(methylthio)pyridine with hydrogen peroxide.

2-trichloromethyl-3,5,6 - trichloro - 4 - (methylsulfinyl) pyridine (molecular weight of 271) by oxidizing 2-trichloromethyl-3,5,6-trichloro-4-(methylthio)pyridine with hydrogen peroxide.

In accordance with the present invention, it has been discovered that the sulfinyl- and sulfonyl-pyridine compounds can be employed as pesticides for the control and killing of many bacterial and fungal pests. A particular advantage of the present invention is that the compounds are of low toxicity to mammals and to plants and can be applied to plants and plant parts for fungal control without significant injury to the plants. Thus, they can be applied to the aerial portions of growing plants to control leaf-attacking fungal organisms, dispersed in the soil to control the root-attacking organisms of mold and damping off and applied to orchard floor surfaces to control over-wintering spores of many fungal organisms. In still other operations, they can be employed to treat seeds to protect the seeds and the emerging seedlings against the organisms of rot and decay. In still further operations, the sulfinyl- and sulfonylpyridine compounds or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by microorganisms. Also, the compounds can be distributed in textiles, cellulosic materials or in grain or can be employed in the impregnation of wood and lumber to preserve and protect such products from the attack of the organisms of rot, mold and decay.

The treatment and exposure of pests, their habitats and food with pesticidal amounts of the sulfinyl- and sufonyl-pyridine compounds is essential for the practice of the methods of the present invention. Good controls of fungal organisms are obtained when the toxicant compounds are applied to the above-ground portions of terrestrial plants at a dosage of from ⅛ to 10 or more pounds per acre. In applications to soil for the control of root-attacking fungi, good results are obtained when the sulfinyl- and sulfonylpyridine compounds are applied so as to be present in the soil in the amount of at least 1 part by weight per million parts of soil. In applications to field soil, good results are obtained when the toxic compounds are distributed at a rate of from ⅛ to 100 pounds or more per acre and through some cross section of the soil as to provide for the presence therein of at least 1 part by weight per million parts by weight of soil. In general field applications, it is usually preferred that the compounds be distributed to a depth of at least 2 inches below the soil surfaces. Oftentimes it is desirable to distribute the compounds to a depth of at least 24 inches to avoid reinfestation of the soil by deep dwelling fungal and bacterial organisms. In applications to the furrow and seed row for the suppression of seedling disease, it is desirable that the compounds be distributed upon the surface of the furrow at a dosage of at least 0.5 pound per acre of furrow soil surface.

In the protection and preservation of inks, adhesives, soaps, plaster, wallboard, cutting oils, textiles, polymeric materials and paper, good results are obtained when the compounds are incorporated in such products in the amount of at least 0.05 percent by weight. In the protection of seeds, good results are obtained when the seeds are treated with the compounds at a dosage of at least 0.5 ounce per 100 pounds of seed. In the preservation of wood, excellent results are obtained when the compounds are incorporated by conventional treatment of the wood in the amount of at least 0.1 pound per cubic foot of wood.

In the preservation and protection of oil and latex paints and primers against destruction caused by the growth of bacteria or fungi, the compounds of the present invention are preferably employed at concentrations of at least 0.3 percent by weight.

The method of the present invention can be carried out by treating plants and plant parts and their habitats with a pesticidal amount of the unmodified agents or by exposing plants and plant parts and their habitats to a pesticidal amount of such agents wherein the term "plant and plant parts" is inclusive of terrestrial, fungal and bacterial plants. In such operations, the unmodified compounds are distributed or incorporated in pesticidal amounts in adhesives, soaps, inks, wallboard cutting oils, textiles, paper, polymeric materials, paint, lumber, wood products or growth media or upon the surfaces of the above-ground portion of plants. However, the present method also embraces the employment of liquid or dust compositions containing the toxicants. In such usage, the compounds are modified with one or a plurality of additaments or adjuvants including water, organic solvents, petroleum oils, petroleum distillates, napthas, or other liquid carriers, polymeric thickening agents, urea, surface active dispersing agents and finely divided inert solids. Depending upon the concentration of toxicant, such augmented compositions are adapted to be distributed in inks, adhesives, soaps, cutting oils, polymeric materials, paints, textiles, wallboard, paper, lumber or soil or upon the above-ground surfaces of plants, or to be employed as concentrates and subsequently diluted with additional liquid or solid carriers to produce the ultimate treating compositions. In compositions wherein the adjuvant or helper is a finely divided solid, a surface active agent or the combination of a surface active agent and a liquid diluent, the carrier cooperates with the active component so as to facilitate the invention and to obtain an improved and outstanding result.

The exact concentration of the toxicants to be employed in the treating compositions is not critical and may vary considerably provided the required dosage of the effective agent is supplied in the ink, adhesive, soap, cutting oil, polymeric material, paint, textile, paper, wood or growth medium or upon plant foliage. The concentration of toxicant in liquid compositions generally is from about 0.0001 to 50 percent by weight. Concentrations up to 95 percent by weight are oftentimes conveniently employed. In dusts, the concentrations of the toxicant can be from about 0.1 to 95 percent by weight. In compositions to be employed as concentrates, the toxicants can be present in a concentration of from 5 to 98 percent by weight. The quantity of treating composition to be applied to textiles, lumber or growth media or to the foliage of plants may vary considerably provided that the required dosage of active ingredients is applied in sufficient amounts of the finished composition adequately to cover the vegetation to be treated or to facilitate the peneration and distribution of said ingredients in and on textiles, lumber or growth media. The required amount of active ingredients in the soil conveniently can be supplied per acre treated in from about 10 to 27,000 gallons or more of liquid carrier or in from about 50 to 2,000 pounds of inert solid carrier. In the treatment of seedling plants, good coverage is obtained when using from about 10 to 60 gallons of finished spray per acre. Where large succulent vegetation is concerned, it is frequently desirable to employ up to 250 gallons or more of the finished spray composition per acre to assure complete coverage of the above-ground portions of the vegetation. In application of dusts to plant foliage, good results are obtained with from 40 to 200 pounds of finished dust per acre, the only requirement being that the required toxicant dosage be supplied in sufficient dust to achieve good coverage of the foliage.

In the treatment of lumber, from about 1 to 3 gallons of solvent composition is usually applied per 1,000 square feet of surface to be treated. In the pressure or vacuum treatment of lumber, sufficient composition is employed adequately to impregnate the wood.

In the preparation of dust compositions, the toxicant products can be compounded with any of the finely divided solids, such as pyrophyllite, talc, chalk, gypsum, and the like. In such operations, the finely divided carrier is ground or mixed with the toxicant or wet with a solution of the toxicant in a volatile organic solvent. Similarly, dust compositions containing the products can be compounded with various solid surface active dispersing agents such as fuller's earth, bentonite, attapulgite and other clays. Depending upon the proportions of ingredients, these dust compositions can be employed for the control of pests or employed as concentrates and subsequently diluted with an additional solid surface active dispersing agent or with pyrophyllite, chalk, talc, gypsum and the like to obtain the desired amount of active ingredient in a composition adapted to be employed for the control of fungi. Also, such dust compositions when employed as concentrates can be dispersed in water, with or without the aid of dispersing agents to form spray mixtures.

Further, spray compositions can be prepared by incorporating the sulfinyl- or sulfonylpyridines or their liquid or dust concentrate compositions in intimate mixtures with surface-active dispersing agents such as an ionic or non-ionic emulsifying agent. Such compositions are readily employed for the control of pests or are dispersed in liquid carriers to form diluted sprays containing the toxicants in any desired amount. The choice of dispersing agents and amounts thereof employed are determined by the ability of the agents to facilitate the dispersion of the concentrate in the liquid carrier to produce the desired spray compositions.

Similarly, the toxicant products can be compounded with a suitable water-immiscible organic liquid and a surface-active dispersing agent to produce an emulsifiable concentrate which can be further diluted with water and oil to form spray mixtures in the form of oil-in-water emulsions. In such compositions, the carrier comprises an aqueous emulsion, i.e., a mixture of water-immiscible solvent, emulsifying agent and water. Preferred dispersing agents which can be employed in these compositions are oil-soluble and include the non-ionic emulsifiers such as the condensation products of alkylene oxides with the inorganic acids, polyoxyethylene derivatives or sorbitan esters, complex ether alcohols and the like. Also, oil-soluble ionic emulsifying agents such as mahogany soaps can be used. Suitable organic liquids which can be employed in the composition include petroleum oils and distillates, toluene, liquid halohydrocarbon and synthetic organic oils. The surface-active dispersing agents are usually employed in liquid compositions in the amount of from 0.1 to 20 percent by weight of the combined weight of the dispersing agent and active compound.

In addition, other liquid compositions containing the desired amount of effective agent can be prepared by dissolving the toxicant in an organic liquid such as acetone, methylene chloride, chlorobenzene and petroleum distillates. The preferred organic solvent carriers are those which are adapted to accomplish the penetration and impregnation of the pest environment and particularly soil with the toxicant compounds and are of such volatility as to leave little permanent residue thereon. Particularly desirable carriers are the petroleum distillates boiling almost entirely under 400° F. at atmospheric pressure and having a flash point above 80° F.

In further embodiments, the sulfonyl and sulfinyl compounds as employed in accordance with the present invention, or compositions containing the same, can be advantageously employed in the present invention in combination with one or more pesticidal or preservative compounds. In such embodiment, such pesticidal or preservative compound is employed either as a supplemental toxicant, an additament or as an adjuvant. Representative pesticidal or preservative compounds include the substituted phenols, cresols, substituted cresols and their metal salts, the bisphenols and thiobisphenols; the halogenated salicylanilides, the organosulfur compounds, the carbamate compounds, the quaternary ammonium compounds, the organometallic compounds, the inorganic salts and miscellaneous other compounds, such as: phenol, cresol, trichlorophenols, tetrachlorophenols, pentachlrophenol, p-chloro-m-cresol, sodium pentachlorophenol and other sodium, potassium, etc. salts of the phenols, substituted phenols, cresols and substituted cresols, di- and tribrominated salicylanilides, 2,2'-methylenebis (3,4,6-trichlorophenol), 2,2'-thiobis(4,6-dichlorophenoxide), halogenated trifluoromethyl salicylanilide, disodium ethylenebisthiocarbamate, sodium N-methyldithiocarbamate, zinc dimethyldithiocarbamate, 2-mercaptobenzothiazole, 3,5-dimethyl-tetrahydro - 1,3,5,2H-thiadiazine-2-thione, 2,3-dinitro-1,4-dithia-anthraquinone, dodecyl pyridinium chloride, alkyl dimethyl benzyl ammonium chloride, dialkyl dimethylammonium chloride, phenylmercuric acetate, phenyl-mercuric oleate, phenylmercuric propionate, chloromethoxy acetoxy mercuripropane, bis-tributyl tin oxide, bis-tripropyl tin oxide, copper pentachlorophenate, copper 8-hydroxyquinolate, mercuric chloride, sodium borate, ethylmercuric chloride, 9-undecylenic acid, 10,10'-oxybisphenoxarsine, 1 - (3-chloroallyl)-3,5,7-triaza-1-azoniaadamantane chloride and 1,4-bromobis aceto butene.

The following examples are merely illustrative and are not intended to be limiting.

EXAMPLE 8

Fifty parts by weight of 2,3,5,6-tetrachloro-4-(methylsulfonyl)pyridine is mixed and ground with 18 parts diatomaceous earth (Celite 209), 29 parts of Barden clay (a kaolinite clay), 2 parts of a non-ionic surface active agent (nonylphenol condensed with 9 moles of ethylene oxide), and 2 parts of a substituted benzoid alkyl sulfonic acid (Daxad No. 27) to prepare a concentrate composition in the form of a wettable powder. A portion of this composition is dispersed in water to produce an aqueous spray composition containing ½ lb. of toxicant per 100 gallons of ultimate mixture. This composition is applied to trees of an apple orchard for the control of apple scab (*Venturia inaequalis*). In the treating operations, applications of the spray composition are made at about weekly intervals over a period of 9 weeks duration, the first application being made at the pre-pink stage of bloom of the trees. Unsprayed check trees are maintained in the orchard to provide for a continuous source of re-infestation. One week following the last spray application, the trees are examined and compared with the untreated check trees to determine what percentage control of apple scab is obtained. The examination established that the treets treated with pyridine compound were substantially free of lesions of apple scab. At the time of the observations, the untreated check trees were found to support a very heavy infestation of apple scab.

EXAMPLE 9

In similar operaions, various sulfinyl- and sulfonylpyridine compounds are employed in the form of aqueous sprays for the control of apple scab in the late spring. In such operations, the spray compositions are applied to the foliage of apple trees in an orchard supporting a heavy infestation of the organisms of apple scab. The applications are made to the point of run-off with the spray compositions being employed at a dosage of 0.5 pound of pyridine per acre. Adjacent trees in the orchard are left untreated to serve as checks. Four weeks following the applications, the leaves of the treated trees are examined and compared with the leaves of the untreated trees as respect lesions of apple scab in order to ascertain the percent control of the organisms of apple scab. The pyridine compounds employed together with the results of the observations are set forth in the following table.

TABLE 1

| Test compound: | Percent control of apple scab |
|---|---|
| 2,3,5,6 - tetrachloro-4-(methylsulfonyl)-pyridine | 90–100 |
| 2,3,5,6 - tetrachloro-4-(methylsulfinyl)-pyridine | 90–100 |
| 2,3,5,6 - tetrachloro - 4 - (chloromethylsulfonyl)pyridine | 90–100 |
| 2 - trichloromethyl-3,5,6-trichloro-4-(methylsulfonyl)pyridine | 90–100 |
| 3,5 - dichloro-2,6-dibromo-4-(methylsulfonyl)pyridine | 90–100 |
| 3,5 - dichloro-2,6-difluoro-4-(butylsulfonyl)pyridine | 90–100 |
| 2,3,5,6 - tetrachloro-4-(2'-bromoethylsulfonyl)pyridine | 90–100 |
| 2,3,5,6 - tetrachloro-4-(2',3'-dichloropropylsulfonyl)pyridine | 90–100 |
| 2,3,5,6 - tetrachloro-4-(3',3',3'-trichloropropylsulfonyl)pyridine | 90–100 |
| 2,3,5,6 - tetrachloro - 4 - (butylsulfinyl)pyridine | 90–100 |
| 2,3,5,6 - tetrachloro - 4 - (decylsulfonyl)pyridine | 90–100 |
| 2 - trichloromethyl-3,5,6-trichloro-4-(methylsulfinyl)pyridine | 90–100 |
| 2,3,5,6 - tetrachloro-4-(phenylsulfonyl)pyridine | 90–100 |
| 2,3,5,6 - tetrachloro-4-(o-bromophenylsulfonyl)pyridine | 90–100 |
| 2,3,5,6 - tetrachloro-4-(benzylsulfonyl)pyridine | 90–100 |
| 2,3,5,6 - tetrachloro-4-(p-chlorobenzylsulfonyl)pyridine | 90–100 |
| 2,3,5 - trichloro-4-(methylsulfonyl)pyridine | 90–100 |
| 2,3,6-trichloro-4-(methylsulfonyl)pyridine | 90–100 |
| 2 - fluoro - 3,5 - dichloro-4-(methylsulfonyl)pyridine | 90–100 |
| 2 - trichloromethyl-3,5-dichloro-4-(methylsulfonyl)pyridine | 90–100 |
| 2,3,6 - trichloro-4-(ethylsulfinyl)pyridine | 90–100 |
| 2,3,5 - trichloro-4-(propylsulfinyl)pyridine | 90–100 |
| 2,3,5 - trichloro-4-(5'-bromopentylsulfonyl)pyridine | 90–100 |
| 2,3,5 - trichloro - 4 - (2,2-dichlorobutylsulfonyl)pyridine | 90–100 |
| 2,3,5 - trichloro - 4 - (dodecylsulfonyl)pyridine | 90–100 |
| 2,3,5 - trichloro-4-(benzylsulfonyl)pyridine | 90–100 |
| 2,3,5 - trichloro-4-(p-chlorophenylsulfonyl)pyridine | 90–100 |

At the time of the observation, the foilage of the leaves of the untreated check trees is found to support a heavy infestation of apple scab.

EXAMPLE 10

Forty-five parts by weight of 2-trichloromethyl-3,5,6-trichloro - 4 -(methylsulfonyl)pyridine, 2,3,6-trichloro-4-(methylsulfinyl)pyridine, 2-fluoro-3,5-dichloro-4-(methylsulfonyl)pyridine, 2,3,6 - trichloro-4-(methylsulfonyl)pyridine or 2,3,5-trichloro-4-(methylsulfinyl)pyridine or 2,3,5,6 - tetrachloro-4-(methylsulfonyl)pyridine are mixed and ground with 5 parts by weight of Triton X–155 to prepare water dispersible concentrate compositions containing 90 percent by weight of one of the pyridine materials.

In a further operation, 25 parts by weight of 2,3,5,6-tetrachloro - 4 - (methylsulfinyl)pyridine, 2-trichloromethyl - 3,5 - dichloro-4-(methylsulfonyl)pyridine, 2,3,5,6-tetrachloro - 4 - (methylsulfonyl)pyridine, 2,3,6-trichloro-4-(methylsulfonyl)pyridine or 2,3,5-trichloro-4-(methylsulfonyl)pyridine and 10 parts by weight of Triton X–155 and 65 parts by weight of xylene are mixed together to prepare an emulsifiable concentrate composition containing 25 percent by weight of one of the pyridine compounds.

In a similar manner, 25 parts by weight of 2,3,5-trichloro-4-(methylsulfonyl)pyridine, 2-trichloromethyl-3,5-dichloro-4-(methylsulfonyl)pyridine, 2,3,5,6-tetrachloro-4-(methylsulfonyl)pyridine, 2-trichloromethyl-3,5,6-trichloro-4-(methylsulfonyl)pyridine, 2,3,5,6-tetrachloro-4-(methylsulfinyl)pyridine, 2,3,5,6-tetrachloro-4-(benzylsulfonyl)pyridine or 2,3,5-trichloro-4-(dodecylsulfonyl)pyridine and 71 parts of fuller's earth, 2 parts of alkyl aryl sulfonate (Nacconol NR) and 2 parts of a polymerized sodium salt of a substituted benzoic alkyl sulfonic acid (Daxad No. 27) are mechanically mixed and ground together to prepare a concentrate in the form of a wettable powder and containing 25 percent by weight of one of the pyridine compounds.

A mixture of 20 parts by weight of 2,3,6-trichloro-4-(dodecylsulfonyl)pyridine, 2,3,5-trichloro-4-(methylsulfonyl)pyridine, 2,3,5,6-tetrachloro-4-(methylsulfinyl)pyridine or 2,3,5,6-tetrachloro-4-(methylsulfonyl)pyridine, 0.1 part of Nacconol NR, 0.1 part of Daxad No. 27 and 200 parts of water are ball-milled together to prepare water dispersible liquid concentrate compositions containing 20 parts by weight of one of the pyridine compounds. The concentrate compositions thus prepared can be dispersed in water to prepare aqueous compositions which have very desirable wetting and penetrating properties and are adapted to distribute microbicidal amounts of the sulfinylpyridine and/or sulfonyl-pyridines in and on plaster, ink, wallboard, textiles, paper, adhesives, soaps, synthetic detergents, cutting oils, polymeric materials, oil or latex paints, soil, seeds or plant foliage.

EXAMPLE 11

Acetone solutions containing 2 grams of various sulfinyl- and sulfonylpyridine compounds per liter are employed for the treatment of corn seeds to protect the seeds against the attack of the organisms of rot and damping off. In such operations, the corn seeds are uniformly wet with the compositions in an amount sufficient to supply one ounce of one of the pyridine compounds per 100 pounds of seed. Following the treating operations, the seeds are dried and thereafter planted in seeds beds of sandy loam soil of good nutrient content which contained a very heavy infestation of Phythium spp. In a check operation, other corn seeds are similarly planted in adjacent areas of the sandy loam soil containing the same heavy infestation of Phythium spp.

After 10 days, observations are carried out to determine the percent emergence, and the roots of the emerged seedlings examined for the lesions of the complex of root rot fungi. In the seed beds treated with the pyridine compounds, there was found a 100 percent emergence of the seedlings of corn with the roots of the seedlings being substantially free of any fungal lesions. At the time of these observations, there was found a 15 percent emergence of seedlings in the check beds with the roots of the emergent seedlings being heavily covered with the lesions of the complex of root rot fungi. The pyridine compounds employed in these operations are set forth in the following table:

TABLE II 2,3,4,6-tetrachloro-4-(methylsulfonyl)pyridine
6-trichloromethyl-3,5-dichloro-4-(methylsulfonyl)-pyridine
2,3,5-trichloro-4-(methylsulfonyl)pyridine
2,3,5-trichloro-4-(2'-bromoethylsulfonyl)pyridine
3,5-dichloro-2,6-difluoro-4-(methylsulfonyl)-pyridine
3,5-dichloro-2-fluoro-4-(methylsulfonyl)pyridine
2,3,5-trichloro-4-(benzylsulfonyl)pyridine
2,3,5-trichloro-4-(butylsulfinyl)pyridine
2,3,6-trichloro-4-(methylsulfonyl)pyridine
2-bromo-3,5-dichloro-4-(mehylsulfonyl)pyridine
2,3,5-trichloro-4-(methylsulfonyl)pyridine
2,3,4,6-tetrachloro-4-(methylsulfinyl)pyridine

EXAMPLE 12

Various sulfinyl- and/or sulfonylpyridine compounds are employed in paint compositions to protect the paint from attack and subsequent degradation by the organisms of mold and mildew. In such operations, the sulfinyl- or sulfonylpyridine compounds are dispersed and incorporated in latex paint samples in the amount of at least 0.3 percent by weight of the ultimate paint composition.

The paint employed in these operations is prepared by intimately blending a pigment dispersion with a letdown including a synthetic latex comprising an interpolymer of ethyl acrylate, methyl methacrylate, acrylic acid and methacrylic acid. The paint has the following composition.

| Pigment dispersion: | Approximate lbs. per 100 gallons |
|---|---|
| Water | 140 |
| Potassium tripolyphosphate | 1.5 |
| Titanium dioxide | 240 |
| Mica (325 mesh) | 50 |
| Calcium carbonate | 20 |
| Clay (finely ground) | 20 |
| Propylene glycol (mol. wt. 1200) | 4 |
| Let down: | |
| Methyl cellulose | 150 |
| Synthetic latex | 506 |
| Anti-foam agent | 10 |

In similar operations, oil paint primers containing compounds of the present invention as the sole protective constituent are formulated.

Wood panels are then painted with the modified compositions as well as with an unmodified paint. The panels are dried and thereafter exposed two months in a tropical chamber at a relative humidity of 95 percent and a temperature of 82° F. Following this period, the wood panels are examined to ascertain what control of plant growth is obtained. The compounds employed and the results to be obtained are set forth in the following table.

TABLE III

| Test compounds: | Percent control of the organisms of mold and mildew |
|---|---|
| 2,3,5-trichloro-4-(methylsulfonyl)pyridine | 100 |
| 2-trichloromethyl-3,5-dichloro-4-(methylsulfonyl)pyridine | 100 |
| 2,3,5,6-tetrachloro-4-(methylsulfonyl)pyridine | 100 |
| 2,3,5,6-tetrachloro-4-(methylsulfinyl)pyridine | 100 |
| 2,3,5-trichloro-4-(methylsulfinyl)pyridine | 100 |
| 2,3,5,6-tetrachloro-4-(propylsulfonyl)pyridine | 100 |
| 2-bromo-3,5-dichloro-4-(methylsulfonyl)pyridine | 100 |
| 2,3,5,6-tetrachloro-4-(ethylsulfonyl)pyridine | 100 |
| 3,5-dichloro-2-fluoro-4-(methylsulfonyl)pyridine | 100 |
| 3,5-dichloro-2,6-difluoro-4-(methylsulfonyl)pyridine | 100 |

At the time of the observation, the check panels painted with the unmodified composition are found to support a heavy growth of the organisms of mold and mildew covering approximately 75 percent of the painted surfaces.

EXAMPLE 13

2,3,5,6-tetrachloro-4-(methylsulfonyl)pyridine, 2,3,5,6-tetrachloro-4-(methylsulfinyl)pyridine and 2,3,5-trichloro-4-(methylsulfonyl)pyridine are employed for the treatment of wood to protect the wood from the degradation and attack of the organisms of rot, decay and mildew. In such operations, wood blocks are treated with a 5 percent solution of one of the compounds in aromatic naphtha to impregnate the wood in an amount of 0.6 pound of one of the pyridyl compounds per cubic foot of wood.

The treated blocks and untreated check blocks are then weathered in field soil and under tropical conditions for one year. After such exposure, the treated blocks are found to be free from the attack of the organisms of rot, decay and mildew. At the time of the observations, the untreated blocks were found to support a heavy growth of the complex of the organisms of rot and decay.

EXAMPLE 14

2,3,5,6-tetrachloro-4-(methylsulfonyl)pyridine and 2,3,5-trichloro-4-(methylsulfonyl)pyridine are employed as preservatives in cutting oil emulsions to protect such emulsions from degradation and attack by the organisms of mold and mildew. In such operations, the pyridine compounds are dispersed in aqueous cutting oil emulsions containing one part by volume of cutting oil per 40 parts of aqueous emulsion to produce emulsion compositions containing 0.1 percent by weight of one of the pyridine compounds. The oil employed as a typical commercial cutting oil consists essentially of light mineral oil, an organic emulsifier and an aliphatic alcohol coupling agent. These treated compositions are then heavily inoculated with a cutting oil emulsion which is heavily contaminated with the plant organisms of mold and mildew following industrial use. In a check operation, aqueous cutting oil suspensions untreated with the pyridine materials are similarly inoculated.

After 7 days, the suspensions are subcultured on nutrient agar and the subcultures incubated for 48 hours at 30° C. Following the incubation period, the subcultures are examined in order to determine the percent kill of bacterial organisms. The observations show that the two pyridine compounds gave a complete kill of the organisms of mold and mildew. At the time of the observation, the subcultures from the untreated check suspensions are found to support a very heavy growth of the organisms of mold and mildew.

EXAMPLE 15

Acetone solutions containing 25 grams of various sulfinyl- and sulfonylpyridine compounds per liter are employed for the treatment of sandy loam soil heavily infested with the organisms, *Fusarium oxysporum lycopersici* and *Rhizoctonia solani*. In the treating operations, the soil is placed in sealable containers and separately injected with the acetone compositions in an amount sufficient to supply 50 parts by weight of one of the pyridine compounds per million parts by weight of soil. Following the treatment, the containers are sealed and the soil therein mixed to insure uniform distribution of the treating composition. After mixing, the containers of treated soil are incubated at an average temperature of 25° C. In a check operation, sealed containers containing the same infested but untreated soil are exposed to identical conditions as the treated soil.

After three days, the containers are opened and portions of the treated and untreated soil cultured by the dilution plate method as described by J. P. Martin in "Soil Science" 69, No. 3, pp. 215-32 (March 1950) to determine the percent control of fungus organisms. In the latter operations, the culturing medium employed is a peptone dextrose agar (1000 milliliters of water, 10 grams of dextrose, 5 grams of peptone, 1 gram of $KH_2PO_4$, 0.5 gram of $MgSO_4 7H_2O$ and 20 grams of agar) containing 0.069 gram of rose bengal and 0.030 gram of streptomycin per liter of ultimate mixture. In the plating operations, the culturing medium is incorporated with about 0.5 gram of soil sample per liter of medium and the plates thereafter poured in replicates of three for the treated and check soils. The poured plates are then incubated for three days at 25° C.

After incubation, the plates are examined and counts of fungus colonies made in order to determine the percent control of fungus organisms. The pyridine compounds employed and the results obtained in the described operations are set forth in the following table:

TBALE IV

| Test Compound | Percent Control | |
|---|---|---|
| | *Fusarium oxysporum lycopersici* | *Rhizoctonia solani* |
| 2,3,5,6-tetrachloro-4-(methylsulfonyl) pyridine | 90-100 | 90-100 |
| 2,3,5-trichloro-4-(methylsulfonyl) pyridine | 90-100 | 90-100 |
| 2,3,5,6-tetrachloro-4-(methylsulfinyl) pyridine | 90-100 | 90-100 |
| 2,3,5-trichloro-4-(methylsulfinyl) pyridine | 90-100 | 90-100 |
| 2-bromo-3,5-dichloro-4-(methylsulfonyl) pyridine | 90-100 | 90-100 |
| 3,5-dichloro-2-fluoro-4-(methylsulfonyl) pyridine | 90-100 | 90-100 |
| 3,5-dichloro-2,6-difluoro-4-(methylsulfonyl) pyridine | 90-100 | 90-100 |
| 2-trichloromethyl-3,5-dichloro-4-(methylsulfonyl) pyridine | 90-100 | 90-100 |

At the time of the observations, the plates from the untreated check soil are found to support the growth of numerous colonies of the named fungal organisms.

The preferred compounds of the present invention include the sulfinyl and sulfonyl pyridine compounds wherein L represents 2,3,5-trichloropyridyl-, tetrachloropyridyl and 2-trichloromethyl-3,5-dichloropyridine. Of particular value in accordance with the present teachings are the sulfonyl pyridine compounds wherein L represents tetrachloropyridyl. Representative preferred compounds include 2,3,5,6 - tetrachloro-4-(methylsulfonyl)pyridine; 2,3,5,6 - tetrachloro - 4 - (methylsulfinyl)pyridine; 2,3,5-trichloro - 4 - (methylsulfonyl)pyridine; 2 - trichloromethyl - 3,5 - dichloro - 4 - (propylsulfonyl)pyridine; 2,3,5-trichloro - 4 - (propylsulfonyl)pyridine and 2,3,5,6-tetrachloro-4-(propylsulfinyl)pyridine.

Although the compounds, methods and compositions of the present inventions are useful for the control of a number of parasites, and in particular, for the control of a number of fungal organisms, such teaching is not to be construed as a teaching that all of the methods, compositions and compounds are equivalents for the control of a particular pest or a particular fungal organism.

The thiopyridine starting materials characterized by one of the formulae

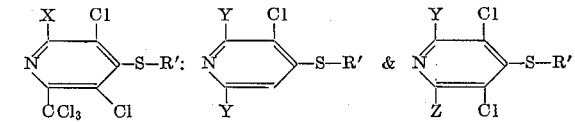

wherein R' represents alkyl, phenyl, monohalophenyl, benzyl and monohalobenzyl are prepared in accordance with known methods. In such method, a suitable alkali metal mercaptan (R'—S-alkali metal) and preferably the sodium derivative, is reacted with a pyridine compound characterized by one of the formulae:

(A)

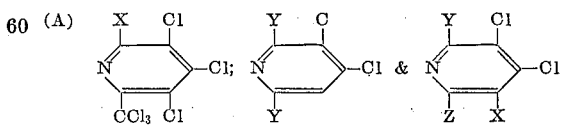

The reaction proceeds readily at temperatures of from 60° to 100° C. with the production of the desired thiopyridine starting material and alkali metal halide of reaction.

In an alternative method, the pyridine compounds as identified under (A) above are reacted with sodium sulfide to prepare the mercaptan of the corresponding pyridine wherein the mercapto group enters the 4 position on the pyridine nucleus. These mercaptans are thereafter reacted with a suitable halide (R'X) to obtain the desired starting material. Where it is desired to obtain the thiopyridine starting materials wherein R represents monohalolower-alkyl, dihalolower-alkyl or trihalolower-alkyl, the mercaptans of the pyridines prepared as described above are reacted with an equimolar quantity of a suitable haloloweralkane. The reaction takes place readily in organic solvent as reaction medium and at temperatures of from 60° to 120° C. with the production of the desired starting material and alkali metal halide of reaction.

In other procedures, certain of these starting products can be prepared by the treatment of certain thiopyridine derivatives (L—S—R″) wherein R″ represents an unsaturated moiety such as vinyl, allyl, methallyl, propenyl, propynyl, butenyl, pentenyl and pentynyl with halide or hydrogen halide to saturate said moiety. These latter compounds containing an unsaturated moiety can be prepared in the above-described method wherein the alkali metal mercaptan is R″-S-Na. In further procedures, the thiopyridine starting materials having the formula

L—S—R‴ wherein R‴ represents methyl are readily halogenated in the R‴ side chain in carbon tetrachloride at temperatures of about 60° C. to prepare various other starting products.

The 2,3,4,5-tetrachloropyridine, 2,3,4,6-tetrachloropyridine and pentachloropyridine employed as above described can be prepared in known procedures by the chlorination of pyridine in glacial acetic acid and preferably at the boiling temperature of the mixture. Similar pyridines wherein one or both of the 2- and 4- and/or 6- positions are occupied by bromine and/or fluorine are also employed in the production of various starting materials. These products are readily obtained in known procedures wherein the above-identified tetrachloropyridines and pentachloropyridines are treated with potassium fluoride in a solvent such as dimethyl formamide as reaction medium. In such procedures, one atom of fluorine replaces one atom of chlorine in the 2- and 4- and/or 6- positions on the pyridine ring with quantities of the reagents being employed so as to effect the desired exchange. Following the exchange, the desired product is separated by conventional procedures such as washing with water, extraction and fractional distillation. Where it is desired to introduce bromine in the said portions, the polychloropyridine products are treated with gaseous hydrogen bromide in glacial acetic acid and conveniently at the boiling temperature and under reflux.

I claim:
1. The compound having the formula

L—M—R wherein R represents a member of the group consisting of alkyl, monohalolower-alkyl, dihalolower-alkyl, trihalolower-alkyl, phenyl, monohalo-phenyl, benzyl and monohalo-benzyl; M represents a member of the group consisting of sulfinyl (—SO—) and sulfonyl (—SO$_2$—) and L represents a member of the group having the formulae

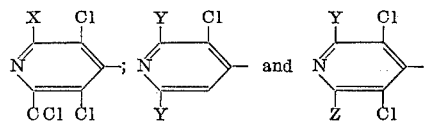

in which X represents a member of the group consisting of chlorine and hydrogen, each Y represents a member of the group consisting of chlorine, bromine and fluorine and Z represents a member of the group consisting of Y or hydrogen.

2. 2,3,5,6-tetrachloro-4-(methylsulfonyl)pyridine.
3. 2,3,5-trichloro-4-(methylsulfonyl)pyridine.
4. 2,3,5,6-tetrachloro-4-(propylsulfonyl)pyridine.
5. 2,3,5,6-tetrachloro-4-(methylsulfinyl)pyridine.
6. 2,3,5,6-tetrachloro-4-(butylsulfinyl)pyridine.
7. 2,3,5-trichloro-4-(ethylsulfonyl)pyridine.
8. 2,3,5,6-tetrachloro-4-(ethylsulfonyl)pyridine.
9. 2,3,5,6-tetrachloro-4-(propylsulfinyl)pyridine.

No references cited.

JOHN D. RANDOLPH, *Primary Examiner.*
WALTER A. MODANCE, *Examiner.*
ALAN L. ROTMAN, *Assistant Examiner.*